(12) United States Patent
Subramanian Karthik

(10) Patent No.: US 9,852,233 B2
(45) Date of Patent: Dec. 26, 2017

(54) AUTOCOMPLETE USING SOCIAL ACTIVITY SIGNALS

(71) Applicant: eBay Inc., San Jose, CA (US)

(72) Inventor: Venkateswaran Subramanian Karthik, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 235 days.

(21) Appl. No.: 14/137,348

(22) Filed: Dec. 20, 2013

(65) Prior Publication Data

US 2014/0280000 A1 Sep. 18, 2014

Related U.S. Application Data

(60) Provisional application No. 61/800,785, filed on Mar. 15, 2013.

(51) Int. Cl.
*G06F 17/30* (2006.01)
(52) U.S. Cl.
CPC .... *G06F 17/30994* (2013.01); *G06F 17/3097* (2013.01)
(58) Field of Classification Search
CPC .................. G06F 17/3097; G06F 17/30994
See application file for complete search history.

(56) References Cited

U.S. PATENT DOCUMENTS

| 6,564,213 | B1* | 5/2003 | Ortega | G06F 17/3064 |
| 2006/0293065 | A1* | 12/2006 | Chew | G06Q 30/02 |
| | | | | 455/456.3 |
| 2011/0295826 | A1* | 12/2011 | McLellan | G06F 17/30867 |
| | | | | 707/706 |
| 2013/0346404 | A1* | 12/2013 | Bennett | G06F 17/30867 |
| | | | | 707/732 |
| 2014/0171129 | A1* | 6/2014 | Benzatti | H04W 4/025 |
| | | | | 455/457 |
| 2016/0036929 | A1* | 2/2016 | Leal | H04L 67/22 |
| | | | | 709/224 |

* cited by examiner

*Primary Examiner* — Grace Park
(74) *Attorney, Agent, or Firm* — Shook, Hardy & Bacon L.L.P.

(57) ABSTRACT

A system and method of providing autocomplete features using social activity signals. In some embodiments, social activity signals associated with a user are received. User-entered text is received from the user in a search field for a search engine. Predicted queries are determined based on the user-entered text and the social activity signals. Each one of the predicted queries comprises predicted text and at least a portion of the user-entered text. The predicted text is absent from the user-entered text. The predicted queries are caused to be displayed in an autocomplete user interface element of the search field. In some embodiments, the social activity signals comprise at least one of a like of content, a share of content, a follow of content, and a comment on content.

20 Claims, 9 Drawing Sheets

500 ⬉

| SOCIAL ACTIVITY TYPE | WEIGHT |
|---|---|
| Like | 0.3 |
| Share | 0.1 |
| Follow | 0.2 |
| Comment | 0.2 |
| Status Update | 0.1 |
| Calendar Event | 0.2 |
| Geolocation | 0.2 |
| ⋮ | ⋮ |

| POTENTIAL PREDICTED QUERY | SOCIAL ACTIVITY SIGNALS | VALUE |
|---|---|---|
| Samsonite | Like | 0.3 |
| Samsung | Follow | 0.2 |
| Sam's Club | Share | 0.1 |
| Seattle Art Museum | (none) | 0.0 |
| ⋮ | ⋮ | ⋮ |

*FIG. 6*

AUTOCOMPLETE USING SOCIAL ACTIVITY SIGNALS

CROSS-REFERENCE TO RELATED APPLICATIONS

This application claims priority to U.S. Provisional Application No. 61/800,785, filed on Mar. 15, 2013, entitled, "SOCIAL SIGNAL FEEDBACK AD GENERATION," which is hereby incorporated by reference in its entirety as if set forth herein

TECHNICAL FIELD

The present application relates generally to the technical field of data processing, and, in various embodiments, to systems and methods of providing autocomplete features using social activity signals.

BACKGROUND

Search engines may include autocomplete features that attempt to suggest relevant queries to users.

BRIEF DESCRIPTION OF THE DRAWINGS

Some embodiments of the present disclosure are illustrated by way of example and not limitation in the figures of the accompanying drawings, in which like reference numbers indicate similar elements and in which:

FIG. 5 illustrates a mapping of social activity types to weights, in accordance with some embodiments;

FIG. 6 illustrates the assignment of predicted query values to potential predicted queries based on corresponding social activity signals;

DETAILED DESCRIPTION

Figure 1:
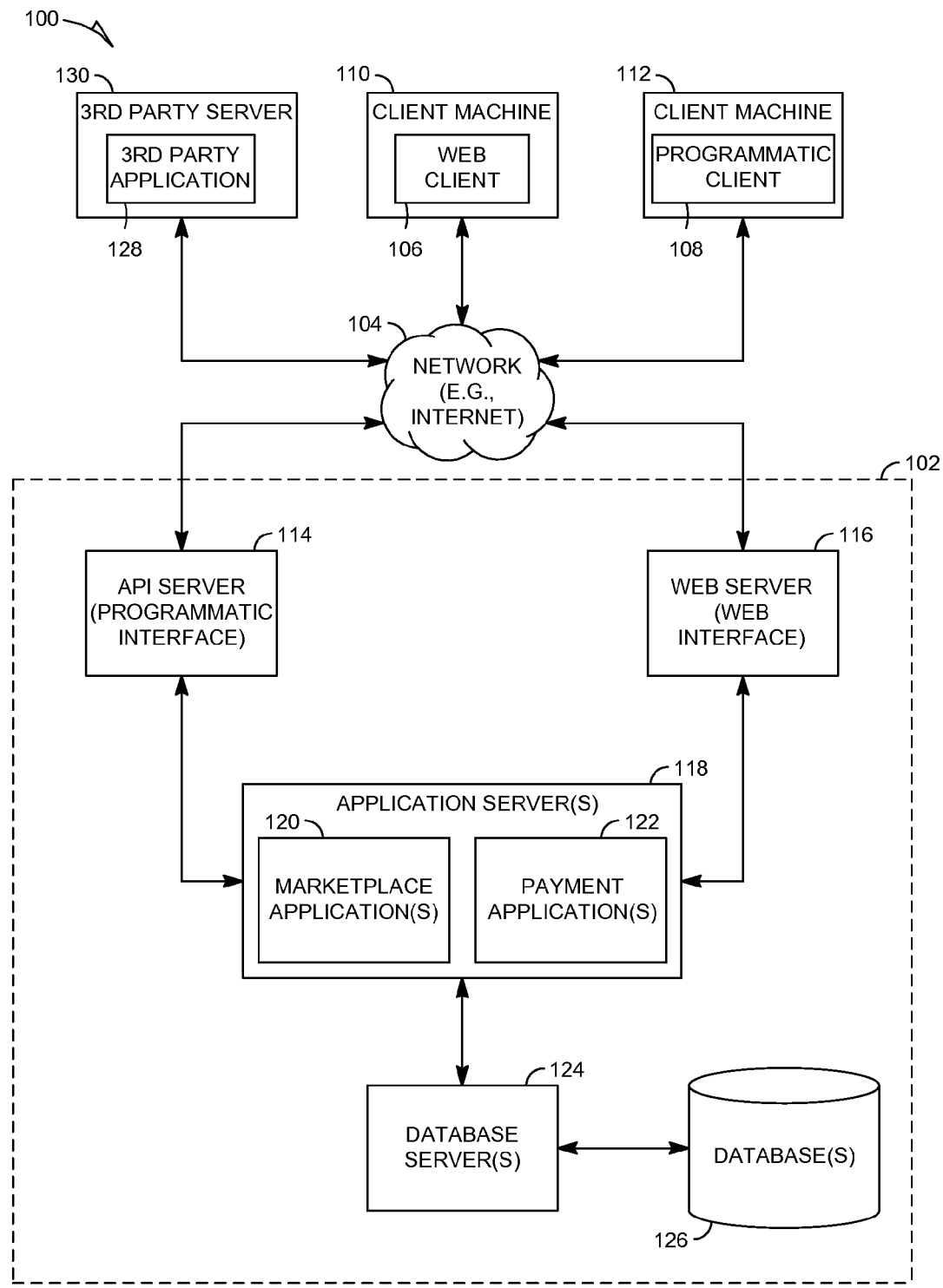
FIG. 1 is a block diagram depicting a network architecture of a system, according to some embodiments, having a client-server architecture configured for exchanging data over a network.

The description that follows includes illustrative systems, methods, techniques, instruction sequences, and computing machine program products that embody illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In some embodiments, a method comprises receiving social activity signals associated with a user. Moreover, user-entered text can be received from the user in a search field for a search engine. Predicted queries can be determined based on the user-entered text and the social activity signals. Each one of the predicted queries can comprise predicted text and at least a portion of the user-entered text. The predicted text can be absent from the user-entered text. The predicted queries can be caused to be displayed in an autocomplete user interface element of the search field. In some embodiments, the social activity signals comprise at least one of a like of content, a share of content, a follow of content, a comment on content, a status update, and a calendar event.

In some embodiments, determining the predicted queries comprises: determining potential predicted queries based on the user-entered text; assigning a corresponding predicted query value to each one of the potential predicted queries based on a determination for each potential predicted query of whether the potential predicted query corresponds to one of the social activity signals; and selecting the predicted queries from the potential predicted queries based on the predicted query values of the potential predicted queries. In some embodiments, the method further comprises determining a display position for each of predicted queries within the user interface element of the search field based on the predicted query values of the corresponding predicted queries. In some embodiments, the method further comprises storing a mapping of social activity types to weights. Each social activity type can have a corresponding weight. Assigning the corresponding predicted query value to each one of the potential predicted queries can comprise: for each potential predicted query determined to correspond to one of the social activity signals, determining the corresponding social activity type of the one of the social activity signals; and for each potential predicted query determined to correspond to one of the social activity signals, calculating the corresponding predicted query value based on the corresponding weight of the corresponding social activity type. In some embodiments, the social activity types comprise at least one of a like of content, a share of content, a follow of content, a comment on content, a status update, a calendar event, and geolocation activity.

In some embodiments, the social activity signals are received from at least one social networking service. In some embodiments, the search engine is part of an e-commerce website. In some embodiments, the autocomplete user interface element comprises an autocomplete box extending from the search field.

The methods or embodiments disclosed herein may be implemented as a computer system having one or more modules (e.g., hardware modules or software modules). Such modules may be executed by one or more processors of the computer system. The methods or embodiments disclosed herein may be embodied as instructions stored on a machine-readable medium that, when executed by one or more processors, cause the one or more processors to perform the instructions.

FIG. 1 is a network diagram depicting a client-server system 100, within which one example embodiment may be deployed. A networked system 102, in the example forms of a network-based marketplace or publication system, provides server-side functionality, via a network 104 (e.g., the Internet or a Wide Area Network (WAN)) to one or more clients. FIG. 1 illustrates, for example, a web client 106 (e.g., a browser, such as the Internet Explorer browser developed by Microsoft Corporation of Redmond, Wash. State) and a programmatic client 108 executing on respective client machines 110 and 112.

An API server 114 and a web server 116 are coupled to, and provide programmatic and web interfaces respectively to, one or more application servers 118. The application servers 118 host one or more marketplace applications 120 and payment applications 122. The application servers 118 are, in turn, shown to be coupled to one or more database servers 124 that facilitate access to one or more databases 126.

The marketplace applications 120 may provide a number of marketplace functions and services to users who access the networked system 102. The payment applications 122 may likewise provide a number of payment services and functions to users. The payment applications 122 may allow users to accumulate value (e.g., in a commercial currency, such as the U.S. dollar, or a proprietary currency, such as "points") in accounts, and then later to redeem the accumulated value for products (e.g., goods or services) that are made available via the marketplace applications 120. While the marketplace and payment applications 120 and 122 are shown in FIG. 1 to both form part of the networked system 102, it will be appreciated that, in alternative embodiments, the payment applications 122 may form part of a payment service that is separate and distinct from the networked system 102.

Further, while the system 100 shown in FIG. 1 employs a client-server architecture, the embodiments are, of course not limited to such an architecture, and could equally well find application in a distributed, or peer-to-peer, architecture system, for example. The various marketplace and payment applications 120 and 122 could also be implemented as standalone software programs, which do not necessarily have networking capabilities.

The web client 106 accesses the various marketplace and payment applications 120 and 122 via the web interface supported by the web server 116. Similarly, the programmatic client 108 accesses the various services and functions provided by the marketplace and payment applications 120 and 122 via the programmatic interface provided by the API server 114. The programmatic client 108 may, for example, be a seller application (e.g., the TurboLister application developed by eBay Inc., of San Jose, Calif.) to enable sellers to author and manage listings on the networked system 102 in an off-line manner, and to perform batch-mode communications between the programmatic client 108 and the networked system 102.

FIG. 1 also illustrates a third party application 128, executing on a third party server machine 130, as having programmatic access to the networked system 102 via the programmatic interface provided by the API server 114. For example, the third party application 128 may, utilizing information retrieved from the networked system 102, support one or more features or functions on a website hosted by the third party. The third party website may, for example, provide one or more promotional, marketplace, or payment functions that are supported by the relevant applications of the networked system 102.

Figure 2:
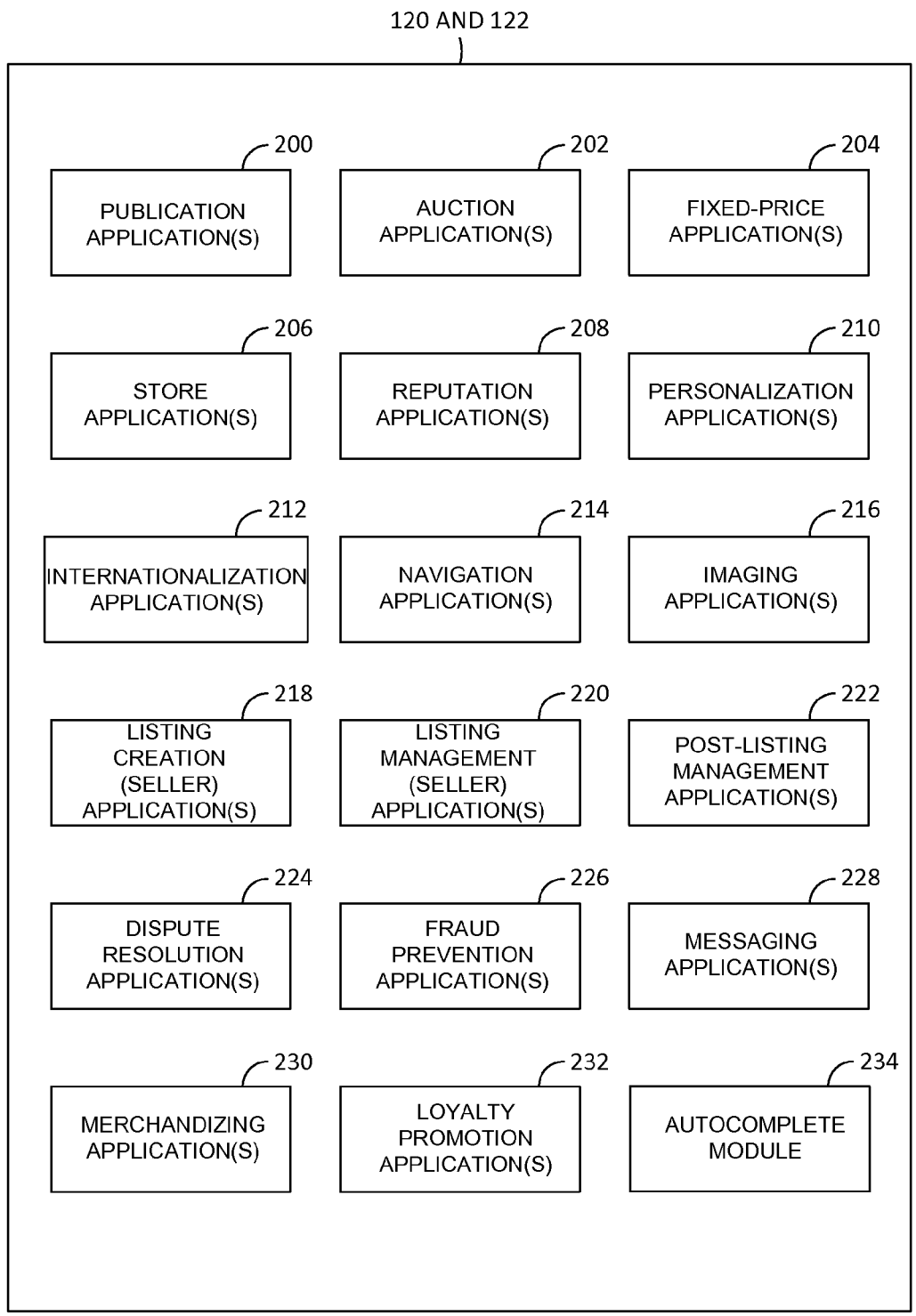
FIG. 2 is a block diagram depicting a various components of a network-based publisher, according to some embodiments.

FIG. 2 is a block diagram illustrating multiple marketplace and payment applications 120 and 122 that, in one example embodiment, are provided as part of the networked system 102. Alternate solutions may include other combinations of these modules. The applications 120 and 122 may be hosted on dedicated or shared server machines (not shown) that are communicatively coupled to enable communications between server machines. The applications 120 and 122 themselves are communicatively coupled (e.g., via appropriate interfaces) to each other and to various data sources, so as to allow information to be passed between the applications 120 and 122 or so as to allow the applications 120 and 122 to share and access common data. The applications 120 and 122 may, furthermore, access one or more databases 126 via the database servers 124. The slide checkout mechanism disclosed herein may be integrated with any or all of the applications described hereinbelow. Some examples of such integration are provided; however, other applications may also have integrations consistent with this disclosure.

The networked system 102 may provide a number of publishing, listing, and price-setting mechanisms whereby a seller may list (or publish information concerning) goods or services for sale, a buyer can express interest in or indicate a desire to purchase such goods or services, and a price can be set for a transaction pertaining to the goods or services. To this end, the marketplace and payment applications 120 and 122 are shown to include at least one publication application 200 and one or more auction applications 202, which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives, and features that are specific and personalized to a relevant seller. The store applications 206 may support an online webstore, such as a hosted solution, where the webstore integrates with the slide checkout mechanism to enable users to easily use the webstore application on a mobile device, wherein the item and item identifier are provided by the store. According to some embodiments, the slide checkout cursor is configured according to input from the store, such as where the cursor is designed and presented to the user having the look and feel of the store. Further, the organization of the information presented to the user may be specific to the store.

Reputation applications 208 allow users who transact, utilizing the networked system 102, to establish, build, and maintain reputations, which may be made available and published to potential trading partners. Consider that where, for example, the networked system 102 supports person-toperson trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page on which information regarding transactions to which the user is (or has been) a party may be viewed. Further, a personalization application 210 may enable a user to personalize listings and other aspects of their interactions with the networked system 102 and other parties. The personalization application(s) 210 may integrate with the slide checkout mechanism such that the user's information is used to generate the selections and options available. In some embodiments, the user is able to specify their preferences, such as incorporate specific payment options, addresses and other considerations. For example, the user may specify that when a particular shipping address is selected, then a selection to identify the item as a gift will be presented on the display; when the user slides over the gift option, a gift receipt is provided with the item, or a gift card is provided with the item.

The networked system 102 may support a number of marketplaces that are customized, for example, for specific geographic regions. A version of the networked system 102 may be customized for the United Kingdom, whereas another version of the networked system 102 may be customized for the United States. Each of these versions may operate as an independent marketplace or may be customized (or internationalized) presentations of a common underlying marketplace. The networked system 102 may, accordingly, include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116. The internationalization applications 212 may integrate with the slide checkout mechanism to provide specific configurations for a geographical area. For example, in Japan, the display may provide the various selection items from right to left, consistent with the reading order for Japanese consumers.

Navigation of the networked system 102 may be facilitated by one or more navigation applications 214. For example, a search application (as an example of a navigation application 214) may enable key word searches of listings published via the networked system 102. A browse application may allow users to browse various category, catalogue, or inventory data structures according to which listings may be classified within the networked system 102. Various other navigation applications 214 may be provided to supplement the search and browsing applications.

In order to make the listings available via the networked system 102, as visually informing and attractive as possible, the applications 120 and 122 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular seller has authored and/or published a large number of listings, the management of such listings may present a challenge. The listing management applications 220 provide a number of features (e.g., auto-relisting, inventory level monitors, etc.) to assist the seller in managing such listings. One or more post-listing management applications 222 also assist sellers with a number of activities that typically occur post-listing. For example, upon completion of an auction facilitated by one or more auction applications 202, a seller may wish to leave feedback regarding a particular buyer. To this end, a post-listing management application 222 may provide an interface to one or more reputation applications 208, so as to allow the seller conveniently to provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102, such as, for example, messages advising users regarding the status of listings at the networked system 102 (e.g., providing "outbid" notices to bidders during an auction process or to providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotions applications 232. For example, a buyer may earn loyalty or promotion points for each transaction established and/or concluded with a particular seller, and be offered a reward for which accumulated loyalty points can be redeemed.

Figure 3:
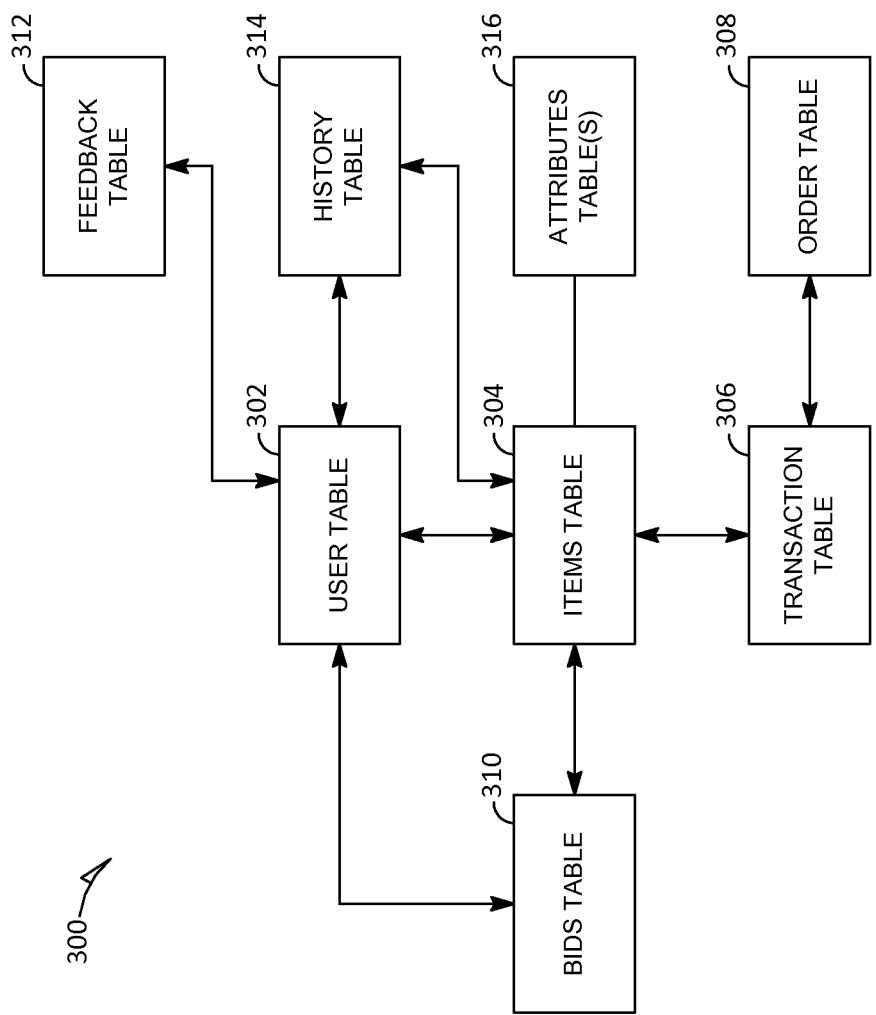
FIG. 3 is a block diagram depicting an example embodiment of various tables that may be maintained within a database.

FIG. 3 is a high-level entity-relationship diagram, illustrating various tables 300 that may be maintained within the database(s) 126, and that are utilized by and support the applications 120 and 122. A user table 302 contains a record for each registered user of the networked system 102, and may include identifier, address and financial instrument information pertaining to each such registered user. A user may operate as a seller, a buyer, or both, within the networked system 102. In one example embodiment, a buyer may be a user that has accumulated value (e.g., commercial or proprietary currency), and is accordingly able to exchange the accumulated value for items that are offered for sale by the networked system 102.

The tables 300 also include an items table 304 in which are maintained item records for goods and services that are available to be, or have been, transacted via the networked system 102. Each item record within the items table 304 may furthermore be linked to one or more user records within the user table 302, so as to associate a seller and one or more actual or potential buyers with each item record.

A transaction table 306 contains a record for each transaction (e.g., a purchase or sale transaction) pertaining to items for which records exist within the items table 304.

An order table 308 is populated with order records, each order record being associated with an order. Each order, in turn, may be associated with one or more transactions for which records exist within the transaction table 306.

Bid records within a bids table 310 each relate to a bid received at the networked system 102 in connection with an auction-format listing supported by an auction application 202. A feedback table 312 is utilized by one or more reputation applications 208, in one example embodiment, to construct and maintain reputation information concerning users. A history table 314 maintains a history of transactions to which a user has been a party. One or more attributes tables 316 record attribute information pertaining to items for which records exist within the items table 304. Considering only a single example of such an attribute, the attributes tables 316 may indicate a currency attribute associated with a particular item, the currency attribute identifying the currency of a price for the relevant item as specified by a seller.

Referring back to FIG. 2, an autocomplete module 234 may be configured to perform any combination of functions related to providing autocomplete functionality disclosed herein, such as discussed below with respect to FIGS. 4-9. Although autocomplete advertising module 234 is shown in FIG. 2 as being incorporated into marketplace and payment applications 120 and 122, it is contemplated that other configurations are also within the scope of the present disclosure.

Figure 4:
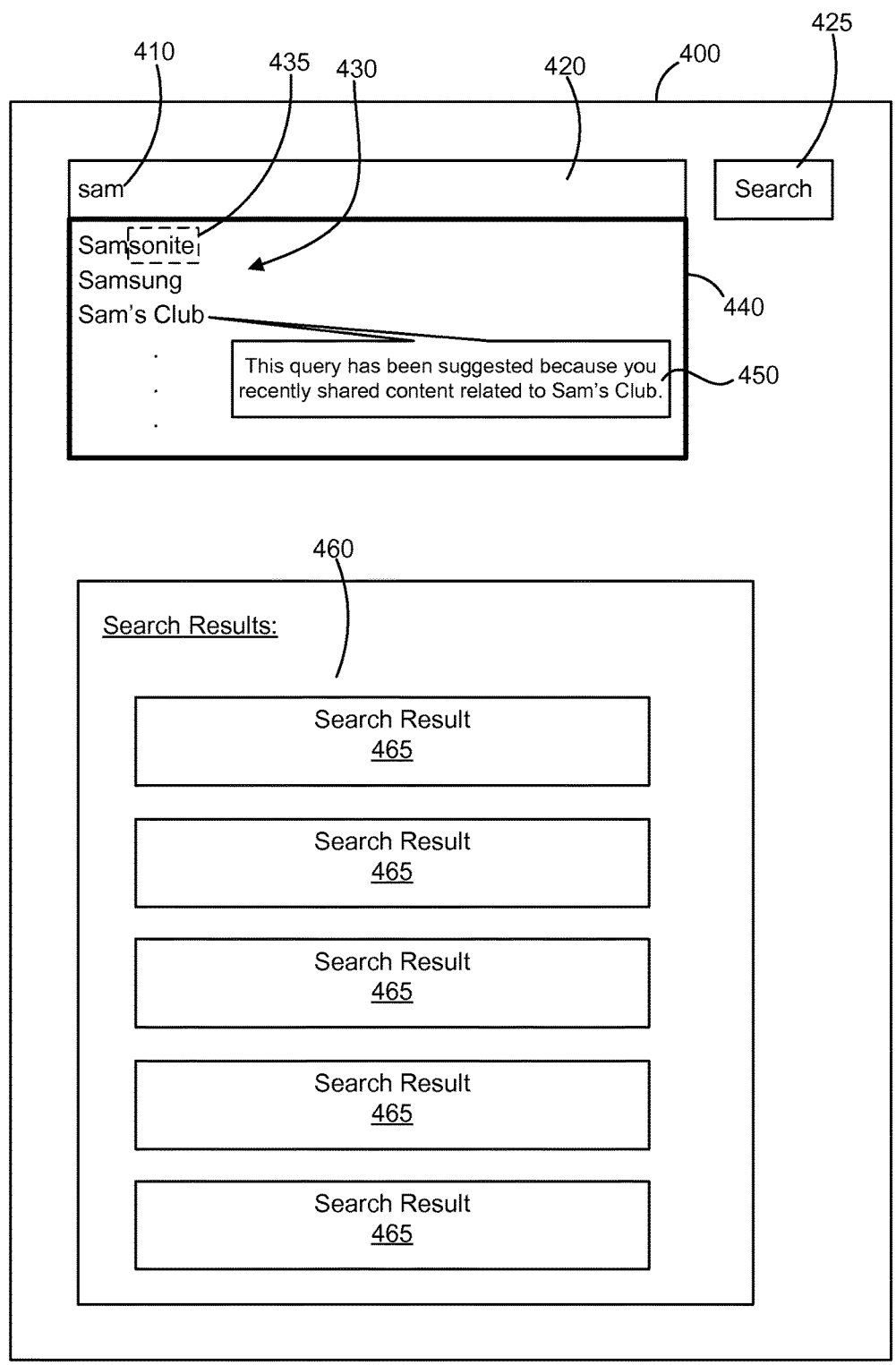
FIG. 4 illustrates a search page on which autocomplete features are provided, in accordance with some embodiments.

FIG. 4 illustrates a search page 400 on which autocomplete features are provided, in accordance with some embodiments. Search page 400 can provide a graphical user interface for the services of a corresponding search engine. In some embodiments, the corresponding search engine comprises a general purpose search engine configured to perform a search of all searchable websites on the World Wide Web. Examples of a general purpose search engine include, but are not limited to, the web search engines used at http://www.google.com and http://www.yahoo.com. In some embodiments, the corresponding search engine comprises a specific purpose search engine configured to perform a search only of a limited number of websites, such as only the website on which it resides. Examples of specific purpose search engines include, but are not limited to, a search engine on an e-commerce website that only searches through the e-commerce website's own content (e.g., searching for an item on http://www.ebay.com), without the search extending beyond that e-commerce website.

Search page 400 can comprise a search field 420 within which user-entered text 410 (e.g., "sam" in FIG. 4) can be received. Autocomplete module 234 can be configured to receive the user-entered text 410 in the search field 420, and to perform an autocomplete function for the user-entered text 410. Autocomplete is a feature that automatically predicts remaining characters of a word or phrase based on what has been input or typed so far. Autocomplete module 234 can perform autocomplete on the user-entered text 410 to determine one or more predicted queries 430 (e.g., "Samsonite", "Samsung", and "Sam's Club" in FIG. 4) based on the user-entered text 410. The predicted queries 430 can comprise at least a portion of the user-entered text 410, as well as predicted text 435. The predicted queries 430 shown in FIG. 4 each comprise the user-entered text 410 "sam", as well as predicted text 435, such as "sonite" for "Samsonite", "sung" for "Samsung", and "'s club" for "Sam's club." In some embodiments, the predicted text is absent from the user-entered text.

Autocomplete module 234 can be configured to determine and display the predicted queries 430 in an autocomplete user interface element 440 for the search field 420 prior to any user-instructed submission to the search engine, such as the user selecting (e.g., clicking or tapping) a selectable "Search" button 425 or providing input corresponding to an enter/return command. The user can provide an instruction for submitting the user-entered text 410 for search. Additionally, the user can provide an instruction for submitting any of the predicted queries 430 for search, such as by selecting (e.g., clicking or tapping) any one of them. In some embodiments, the autocomplete user interface element 440 comprises an autocomplete box extending from the search field 420. Other configurations of the autocomplete user interface element 440 are also within the scope of the present disclosure.

In some embodiments, the determination of the predicted queries 430 can be further based on any combination of one or more of a variety of different social activity signals associated with the user entering the user-entered text 410. The user can be identified using an Internet Protocol (IP) address or login information. Other methods of identifying the user can be used as well. The identification of the user can then be used to retrieve or access social signal activity signals associated with the user. These social activity signals can be obtained from at least one social networking service (e.g., LinkedIn®, Facebook®, Twitter®, Pinterest®, or eBay®) and/or stored in one or more databases (e.g., database(s) 126 in FIG. 1). However, it is contemplated that other sources of the social activity signals are also within the scope of the present disclosure.

In some embodiments, social activity signals of a user comprise any signals corresponding to activity or actions taken by the user that are visible to other users. In some embodiments, these other users are distinguished from administrators or other people having a stake in the activity or actions taken by the user. For example, although the online purchase of an item may be visible to the seller of the item or agents of the e-commerce site facilitating the purchase, online purchases are generally not visible to other users without explicit instruction from the user purchasing the item. Accordingly, an online purchase can be distinguished from social activity. Examples of social activities include, but are not limited to, a like of content, a share of content, a follow of content, a comment on content, a status update (e.g., employer change or career change), a calendar event (e.g., upcoming Christmas party, birthday, vacation to a particular location), and geolocation activity (e.g., geolocation check-in via Foursquare or Facebook or from from geolocation data from activity in eBay or RedLaser mobile app). Other types of social activities are also within the scope of the present disclosure.

The social activity signals of the user can be used to determine which predicted queries 430 to present to the user and what priority to give each one in their presentation. In some embodiments, potential predicted queries can be determined based on the user-entered text 410. A corresponding predicted query value can be assigned to each one of the potential predicted queries based on a determination for each potential predicted query of whether the potential predicted query corresponds to any received social activity signals for the user. The predicted queries 430 to be displayed to the user can then be selected from the potential predicted queries based on the predicted query values of the potential predicted queries.

In some embodiments, a mapping of social activity types to weights can be used to determine predicted query values for the potential predicted queries. Each received social activity signal can be identified as belonging to a certain type. For example, if the user "likes" a particular product, this specific social activity signal can be received by the autocomplete module 234 and its social activity type can be identified as a "Like". Examples of social activity types include, but are not limited to, "Like", "Share", "Follow", "Comment", "Status Update", "Calendar Event", and "Geolocation." Other social activity types are also within the scope of the present disclosure.

FIG. 5 illustrates a mapping 500 of social activity types to weights, in accordance with some embodiments. Each social activity type can have a corresponding weight. For example, in FIG. 5, the social activity type "Like" has a corresponding weight of 0.3, the social activity type "Share" has a corresponding weight of 0.1, the social activity type "Follow" has a corresponding weight of 0.2, the social activity type "Comment" has a corresponding weight of 0.2, the social activity type "Status Update" has a corresponding weight of 0.1, the social activity type "Calendar Event" has a corresponding weight of 0.2, and the social activity type "Geolocation" has a corresponding weight of 0.2. It is noted that the specifics of the example in FIG. 5 are provided for convenience. In some embodiments, the weights can themselves be functions. Other social activity types, weights, and configurations are also within the scope of the present disclosure.

The weights can be used to determine what predicted queries 430 to display to the user and what priority to give each predicted query 430 in the display. In some embodiments, the weights can be used in assigning the corresponding predicted query value to each one of the potential predicted queries. For each potential predicted query determined to correspond to one of the social activity signals, the corresponding social activity type of the corresponding social activity signal can be determined. The determination of whether a potential predicted query corresponds to any of the received social activity signals can be achieved in a variety of ways. In some embodiments, the social activity signals comprise metadata identifying content to which they are directed. For example, if a social activity signal comprises a "like" of a certain product, metadata of the social activity signal can identify that product. An analysis can then be performed to determine how relevant or closely related a potential predicted query is to the identified product. For example, if a social activity signal comprises a "like" of Samsonite, then a potential predicted query of "luggage" may be determined to be closely related to that social activity signal, as Samsonite is a manufacturer and retailer of luggage. If the potential predicted query is determined to be related closely enough to the metadata of the social activity signal, then the potential predicted query can be determined to correspond to the social activity signal. Furthermore, in some embodiments, a matching algorithm can be employed to determine how much text in the potential predicted query matches text in the metadata of a social activity signal, and if a threshold level of matching text is achieved. If the threshold level of matching is achieved, then the potential predicted query can be determined to correspond to the social activity signal.

The corresponding predicted query value for each potential predicted query can be calculated, or otherwise determined, based on the corresponding weights of any corresponding social activity types for which a corresponding social activity signal associated with the user has been received. FIG. 6 illustrates the assignment 600 of predicted query values to potential predicted queries based on corresponding social activity signals. In this example, the potential predicted query "Samsonite" has been determined to correspond to a social activity signal of the type "Like" (e.g., the user could have previously "liked" a Samsonite product or a piece of luggage of another company), the potential predicted query "Samsung" has been determined to correspond to a social activity signal of the type "Follow" (e.g., the user could have previously "followed" a Samsung product or a consumer electronic device of another company), the potential predicted query "Sam's Club" has been determined to correspond to a social activity signal of the type "Share" (e.g., the user could have previously "shared" a product offered for sale at Sam's Club or an article related to Sam's Club), and the potential predicted query "Seattle Art Museum" has been determined to correspond to zero social activity signals associated with the user.

Accordingly, based on the mapping 500 of the social activity type "Like" to a weight of 0.3 in FIG. 5, the predicted query value for the potential predicted query "Samsonite" can be 0.3. Based on the mapping 500 of the social activity type "Follow" to a weight of 0.2 in FIG. 5, the predicted query value for the potential predicted query "Samsung" can be 0.2. Based on the mapping 500 of the social activity type "Share" to a weight of 0.1 in FIG. 5, the predicted query value for the potential predicted query "Sam's Club" can be 0.1. Since the potential predicted query was determined to not correspond to any social activity signals, the predicted query value for it can be 0.0.

The determination of which potential predicted queries to display as the predicted queries 430 can be based on their predicted query values. In some embodiments, the potential predicted queries are ranked based on their predicted query values, with the potential predicted queries with the higher predicted query values being given priority in selection as the predicted queries 430 to be displayed in the autocomplete user interface element 440 in FIG. 4. Furthermore, the display position of each predicted query 430 within the autocomplete user interface element 440 can be determined based on their respective predicted query values, with the predicted queries 430 with the higher predicted query values being given priority in their display positions. Referring back to FIG. 4, potential predicted queries "Samsonite", "Samsung", and "Sam's Club" can be selected as the predicted queries 430 to be displayed based on their respective predicted query values, while potential predicted query "Seattle Art Museum" can be omitted from the predicted queries 430 to be displayed based on its low predicted query value. Additionally, "Samsonite" can be given the top display position in the autocomplete user interface element 440 based on it having the highest predicted query value (a value of 3 in FIG. 6) amongst the predicted queries 430, "Samsung" can be given the middle display position in the autocomplete user interface element 440 based on it having the second highest predicted query value (a value of 2 in FIG. 6) amongst the predicted queries 430, and "Sam's Club" can be given the bottom display position in the autocomplete user interface element 440 based on it having the third highest predicted query value (a value of 1 in FIG. 6) amongst the predicted queries 430. It is noted that the specifics of the example in FIG. 6 are provided for convenience. Other potential predicted queries, social activity signals, predicted query values, and configurations are also within the scope of the present disclosure.

In some embodiments, geolocation activity can be interpreted in a variety of ways in order to determine how relevant potential predicted queries are to a user. In some embodiments, there can be an explicit correlation between a potential predicted query and the user based on geolocation activity. In one example of an explicit correlation, a user can use a check-in feature of a social networking application (e.g., Foursquare or Facebook) while shopping at a Samsonite store. Based on the user checking in to the Samsonite store, it can be determined that there is an explicit correlation between the user and Samsonite. Accordingly, this social activity signal can be used to determine the predicted queries 430, as discussed herein. In some embodiments, there can be an implicit correlation between a potential predicted query and the user based on geolocation activity. In one example of an implicit correlation, a user can have a history of checking in to or traveling to locations that are associated with hiking or the wilderness. Based on this information, it can be inferred that the user would be interested in backpacks. Accordingly, when determining the predicted queries 430, the autocomplete module 234 can determine that the predicted queries 430 should include "Samsonite backpacks" in addition to or instead of simply "Samsonite" based on this inference. Similarly, if the user has a history of checking in to or travelling to locations that are more formal, such as nice hotels, it can be inferred that the user would be interested in more formal items, such as a briefcase. Accordingly, when determining the predicted queries 430, the autocomplete module 234 can determine that the predicted queries 430 should include "Samsonite briefcase" in addition to or instead of simply "Samsonite" based on this inference. It is contemplated that a variety of different inferences can be made by employing a variety of different analyses to geolocation activity signals. Information about where, how, and when a user travels can be used to make inferences about predicted queries 430.

Referring back to FIG. 4, in some embodiments, an explanation 450 of why a predicted query 430 is being suggested can be displayed to the user. For example, in FIG. 4, an explanation 450 for the predicted query "Sam's Club" is displayed, explaining that "This query has been suggested because you recently shared content related to Sam's Club." Other configurations of the explanation 450 are also within the scope of the present disclosure.

Figure 7:
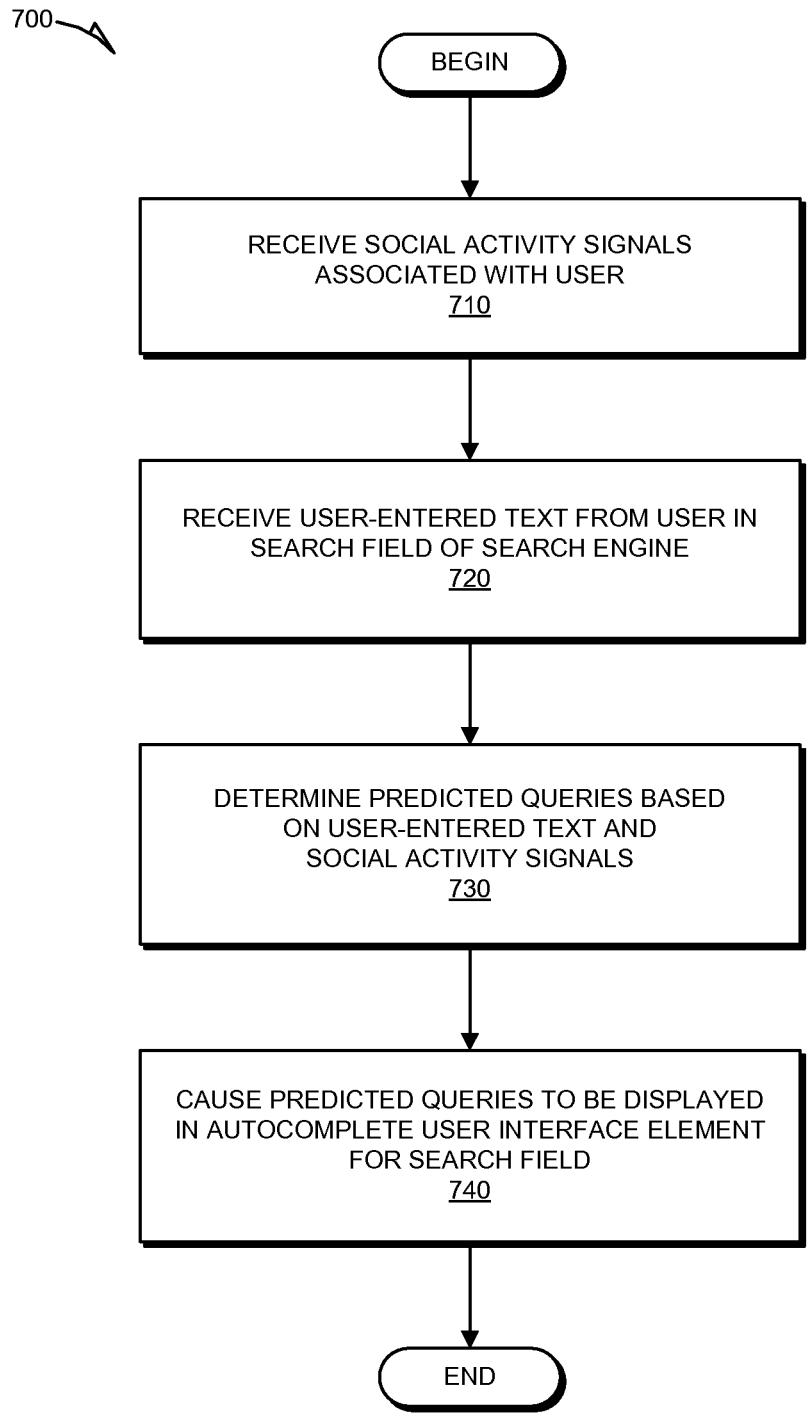
FIG. 7 is a flowchart illustrating a method of providing autocomplete features based on social activity signals, in accordance with some embodiments.

FIG. 7 is a flowchart illustrating a method 700 of providing autocomplete features based on social activity signals, in accordance with some embodiments. The operations of method 700 may be performed by a system or modules of a system (e.g., autocomplete module 234 in FIG. 2). At operation 710, social activity signals associated with a user can be received. At operation 720, user-entered text 410 can be received from the user in a search field 440 for a search engine. At operation 730, predicted queries 430 can be determined based on the user-entered text 410 and the social activity signals. Each one of the predicted queries 430 can comprise predicted text 435 and at least a portion of the user-entered text 410. The predicted text 435 can be absent from the user-entered text 410. At operation 740, the predicted queries 430 can be caused to be displayed in an autocomplete user interface element 440 for the search field 420. It is contemplated that the operations of method 700 may incorporate any of the other features disclosed herein.

Figure 8:
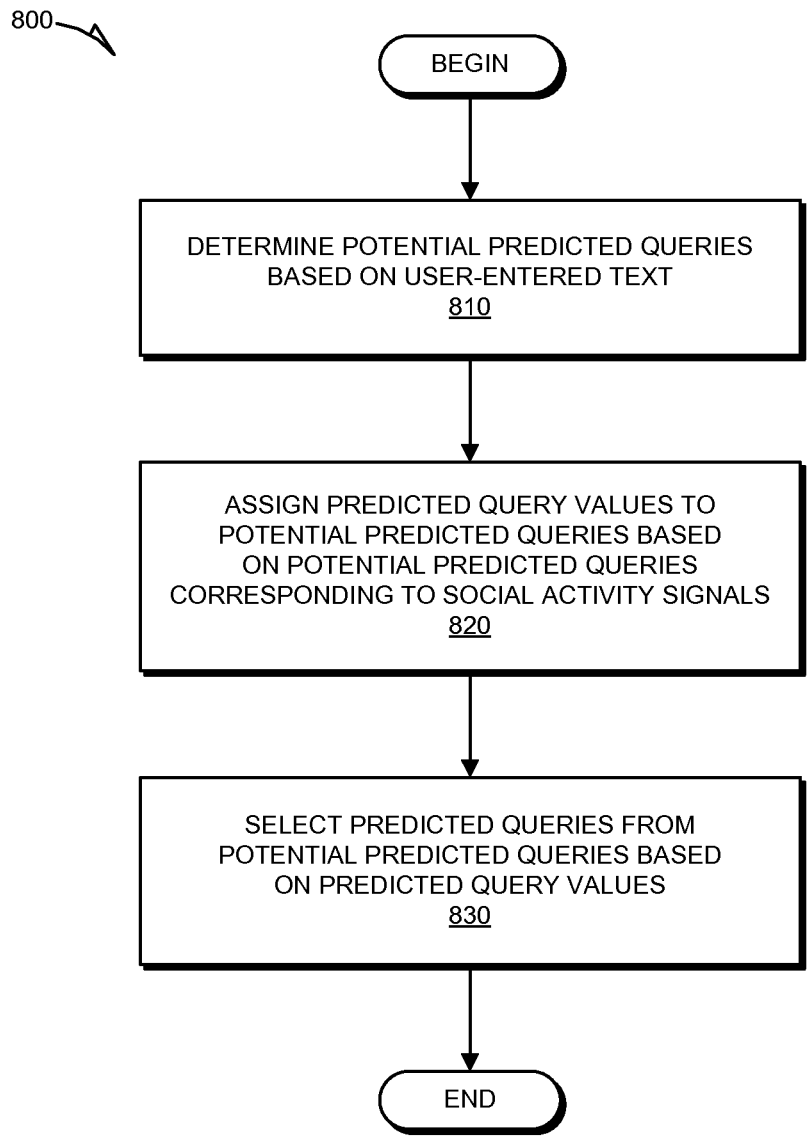
FIG. 8 is a flowchart illustrating a method of determining predicted queries, in accordance with some embodiments.

FIG. 8 is a flowchart illustrating a method 800 of determining predicted queries, in accordance with some embodiments. The operations of method 800 may be performed by a system or modules of a system (e.g., autocomplete module 234 in FIG. 2). At operation 810, potential predicted queries can be determined based on the user-entered text 410. At operation 820, a corresponding predicted query value can be assigned to each one of the potential predicted queries based on a determination for each potential predicted query of whether the potential predicted query corresponds to one of the social activity signals. At operation 830, the predicted queries 430 can be selected from the potential predicted queries based on the predicted query values of the potential predicted queries. It is contemplated that the operations of method 800 may incorporate any of the other features disclosed herein.

Figure 9:
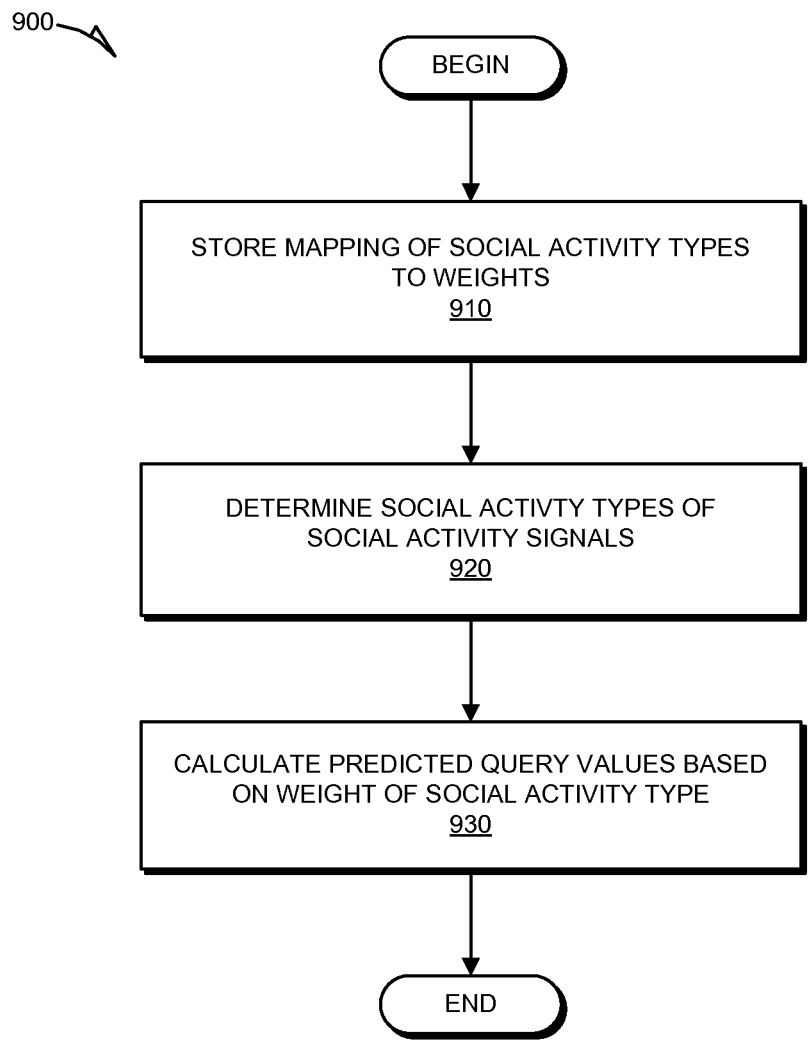
FIG. 9 is a flowchart illustrating a method of assigning predicted query values to potential predicted queries, in accordance with some embodiments.

FIG. 9 is a flowchart illustrating a method 900 of assigning predicted query values to potential predicted queries, in accordance with some embodiments. The operations of method 900 may be performed by a system or modules of a system (e.g., autocomplete module 234 in FIG. 2). At operation 910, a mapping of social activity types to weights can be stored, with each social activity type can have a corresponding weight. At operation 920, for each potential predicted query determined to correspond to one of the social activity signals, determining the corresponding social activity type of the corresponding social activity signal can be determined. At operation 930, for each potential predicted query determined to correspond to one of the social activity signals, the corresponding predicted query value can be calculated based on the corresponding weight of the corresponding social activity type. It is contemplated that the operations of method 900 may incorporate any of the other features disclosed herein.

Referring back to FIG. 4, in some embodiments, the determination of the predicted queries 430 can be further based on any combination of one or more of a variety of different signals other than just social activity signals. These other signals can be obtained from the database(s) 126 in FIG. 1. However, it is contemplated that other sources of the signals are also within the scope of the present disclosure. In some embodiments, these other signals can be used along with the social activity signals to determine the predicted query values for the potential predicted queries. In some embodiments, these other signals are used in other ways to affect the selection of the predicted queries 430 and how they are displayed within the autocomplete user interface element 440.

One of these other signals can be a browsing history of the user entering the user-entered text 410. For example, if the user has a history of viewing Samsonite items or items in the luggage category, then the autocomplete module 234 can use this information to determine that the user is intending to search for Samsonite items, and thus determine "Samsonite"

to be the intended search query rather than some other search query comprising the user-entered text 410 that is not related to luggage at all. The autocomplete module 234 can also use this signal to display the predicted query "Samsonite" in a more prominent position (e.g., in a higher position) than other predicted queries 430.

Another signal can be a purchase history of the user or a bidding history of the user. For example, if the user has a history of purchasing or bidding on Samsonite items or items in the luggage category, then the autocomplete module 234 can use this information to determine that the user is intending to search for Samsonite items, and thus determine "Samsonite" to be the intended search query rather than some other search query comprising the user-entered text 410 that is not related to luggage at all. The autocomplete module 234 can also use this signal to display the predicted query "Samsonite" in a more prominent position (e.g., in a higher position) than other predicted queries 430.

Yet another signal can be context information regarding a context in which the user is providing the user-entered text 410. For example, if the user has specified a search in a particular category just prior to entering the user-entered text 410, then the specification of that particular category can be used as a signal. In one example, if the user has specified that he would like to perform a search in a luggage category, then the autocomplete module 234 can use this information to determine that the user is intending to search for Samsonite items, since Samsonite is a known luggage manufacturer and retailer, and thus determine "Samsonite" to be the intended search query rather than some other search query comprising the user-entered text 410 that is not related to luggage at all. The autocomplete module 234 can also use this signal to display the predicted query "Samsonite" in a more prominent position (e.g., in a higher position) than other predicted queries 430.

It is contemplated that other signals for affecting the selection and display of predicted queries 430 are also within the scope of the present disclosure.

In some embodiments, the user can modify the user-entered text 410 within the search field 420 prior to or subsequent to providing an instruction to submit the user-entered text 410 for search by the search engine. Accordingly, a modified version of the user-entered text 410 can be received in the search field 420. The modified version can comprise an addition of text to the user-entered text 410 or a deletion of text from the user-entered text 410. As a result, one or more subsequent predicted queries 430 can be determined based on the modified version of the user-entered text 410 the same way the previous predicted queries 430 were determined based on the previous version of the user-entered text 410. The subsequent predicted queries 430 can comprise the modified version of the user-entered text 410 and subsequent predicted text 435 absent from the modified version of the user-entered text 410.

One or more search results 465 generated by the search engine of the search page 400 can be presented in a search results section 460 of the search page 400. In some embodiments, the search results 465 can be generated and presented based on and in response to a user-instructed submission of the user-entered text 410 or one of the predicted queries 430. In some embodiments, the search results 465 can be generated and presented prior to a user-instructed submission of the user-entered text 410 or one of the predicted queries 430, such as in response to and based on a detection of the user-entered text 410 or a determination of one of the predicted queries 430. Other configurations are also within the scope of the present disclosure.

It is contemplated that any of the features and/or embodiments discussed herein may be combined or incorporated into any of the other features and/or embodiments.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 10:
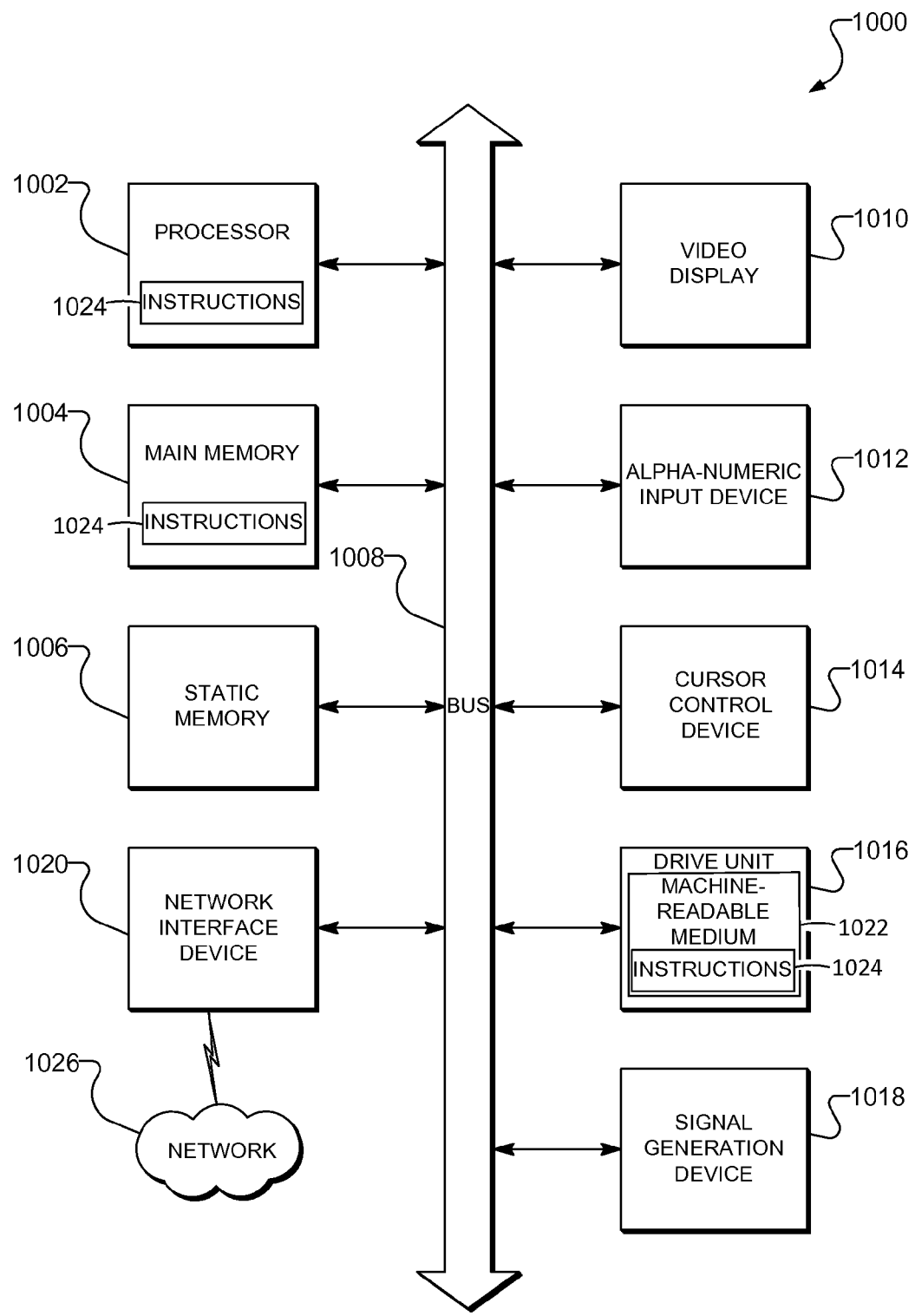
FIG. 10 shows a diagrammatic representation of a machine in the example form of a computer system within which a set of instructions may be executed to cause the machine to perform any one or more of the methodologies discussed herein, in accordance with an example embodiment.

FIG. 10 is a block diagram of a machine in the example form of a computer system 1000 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU), a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a user interface (UI) navigation (or cursor control) device 1014 (e.g., a mouse), a disk drive unit 1016, a signal generation device 1018 (e.g., a speaker) and a network interface device 1020.

Machine-Readable Medium

The disk drive unit 1016 includes a machine-readable medium 1022 on which is stored one or more sets of data structures and instructions 1024 (e.g., software) embodying or utilized by any one or more of the methodologies or functions described herein. The instructions 1024 may also reside, completely or at least partially, within the main memory 1004 and/or within the processor 1002 during execution thereof by the computer system 1000, the main memory 1004 and the processor 1002 also constituting machine-readable media. The instructions 1024 may also reside, completely or at least partially, within the static memory 1006.

While the machine-readable medium 1022 is shown in an example embodiment to be a single medium, the term "machine-readable medium" may include a single medium or multiple media (e.g., a centralized or distributed database, and/or associated caches and servers) that store the one or more instructions 1024 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1024 may further be transmitted or received over a communications network 1026 using a transmission medium. The instructions 1024 may be transmitted using the network interface device 1020 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A computer-implemented method comprising:
    accessing a plurality of social activity signals associated with a user and indicative of actions that are performed by the user and viewable by other users;
    receiving, from the user, user-entered text in a search field for a search engine;
    determining, by a machine having a memory and at least one processor, predicted queries based on the user-entered text and the plurality of social activity signals, each one of the predicted queries comprising predicted text and at least a portion of the user-entered text, the predicted text being absent from the user-entered text, the determining comprising:
        determining potential predicted queries based on the user-entered text; and
        assigning a corresponding predicted query value to each one of the potential predicted queries based on a determination for each potential predicted query of whether the potential predicted query corresponds to one of the social activity signals indicative of an action performed by the user that is viewable by other users, the assigning including:
            for each potential predicted query determined to correspond to one of the plurality of social activity signals indicative of an action performed by the user that is viewable by other users, determining a corresponding social activity type of the one of the plurality of social activity signals indicative of an action performed by the user that is viewable by other users; and
            for each potential predicted query determined to correspond to the one of the plurality of social activity signals, calculating the corresponding predicted query value based on a corresponding weight of the corresponding social activity type; and
    causing the predicted queries to be displayed, to the user, in an autocomplete user interface element of the search field.

2. The computer-implemented method of claim 1, wherein determining the predicted queries comprises:
    selecting the predicted queries from the potential predicted queries based on the predicted query values of the potential predicted queries.

3. The computer-implemented method of claim 1, further comprising determining a display position for each of the predicted queries within the user interface element of the search field based on the predicted query values of the corresponding predicted queries.

4. The computer-implemented method of claim 1, further comprising storing a mapping of social activity types to weights, each social activity type having a corresponding weight.

5. The computer-implemented method of claim 4, wherein the social activity types comprise at least one of a like of content, a share of content, a follow of content, a comment on content, a status update, and a calendar event.

6. The computer-implemented method of claim 1, wherein the plurality of social activity signals comprise at least one of a like of content, a share of content, a follow of content, a comment on content, a status update, and a calendar event.

7. The computer-implemented method of claim 1, wherein accessing the plurality of social activity signals comprises receiving the plurality of social activity signals from at least one social networking service.

8. The computer-implemented method of claim 1, wherein the search engine is part of an e-commerce website.

9. The computer-implemented method of claim 1, wherein the causing the predicted queries to be displayed in the autocomplete user interface element further comprises causing display of an explanation of why a predicted query is being suggested.

10. A system comprising:
a machine having a memory and at least one processor; and
a memory storing instructions that, when executed by the at least one processor, causes the machine to perform operations comprising:
accessing a plurality of social activity signals associated with a user and indicative of actions that are performed by the user and viewable by other users;
receiving, from the user, user-entered text in a search field for a search engine;
determining predicted queries based on the user-entered text and the plurality of social activity signal, each one of the predicted queries comprising predicted text and at least a portion of the user-entered text, the predicted text being absent from the user-entered text, the determining comprising:
determining potential predicted queries based on the user-entered text; and
assigning a corresponding predicted query value to each one of the potential predicted queries based on a determination for each potential predicted query of whether the potential predicted query corresponds to one of the social activity signals indicative of an action performed by the user that is viewable by other users, the assigning including:
for each potential predicted query determined to correspond to one of the plurality of social activity signals indicative of an action performed by the user that is viewable by other users, determining a corresponding social activity type of the one of the plurality of social activity signals indicative of an action performed by the user that is viewable by other users; and
for each potential predicted query determined to correspond to the one of the plurality of social activity signals, calculating the corresponding predicted query value based on a corresponding weight of the corresponding social activity type; and
causing the predicted queries to be displayed, to the user, in an autocomplete user interface element of the search field.

11. The system of claim 10, wherein determining the predicted queries comprises:
selecting the predicted queries from the potential predicted queries based on the predicted query values of the potential predicted queries.

12. The system of claim 10, wherein the operations further comprise determining a display position for each of the predicted queries within the user interface element of the search field based on the predicted query values of the corresponding predicted queries.

13. The system of claim 10, wherein the operations further comprise storing a mapping of social activity types to weights, each social activity type having a corresponding weight.

14. The system of claim 13, wherein the social activity types comprise at least one of a like of content, a share of content, a follow of content, a comment on content, a status update, and a calendar event.

15. The system of claim 10, wherein the plurality of social activity signals comprise at least one of a like of content, a share of content, a follow of content, a comment on content, a status update, and a calendar event.

16. The system of claim 10, wherein accessing the plurality of social activity signals comprises receiving the plurality of social activity signals from at least one social networking service.

17. The system of claim 10, wherein the search engine is part of an e-commerce website.

18. The system of claim 10, wherein the causing the predicted queries to be displayed in the autocomplete user interface element further comprises causing display of an explanation of why a predicted query is being suggested.

19. A non-transitory machine-readable storage medium storing a set of instructions that, when executed by at least one processor, causes the at least one processor to perform a set of operations comprising:
accessing a plurality of social activity signals associated with a user and indicative of actions that are performed by the user and viewable by other users;
receiving, from the user, user-entered text in a search field for a search engine;
determining predicted queries based on the user-entered text and the plurality of social activity signals, each one of the predicted queries comprising predicted text and at least a portion of the user-entered text, the predicted text being absent from the user-entered text the determining comprising:
determining potential predicted queries based on the user-entered text; and
assigning a corresponding predicted query value to each one of the potential predicted queries based on a determination for each potential predicted query of whether the potential predicted query corresponds to one of the social activity signals indicative of an action performed by the user that is viewable by other users, the assigning including:
for each potential predicted query determined to correspond to one of the plurality of social activity signals indicative of an action performed by the user that is viewable by other users, determining a corresponding social activity type of the one of the plurality of social activity signals indicative of an action performed by the user that is viewable by other users; and
for each potential predicted query determined to correspond to the one of the plurality of social activity signals, calculating the corresponding predicted query value based on a corresponding weight of the corresponding social activity type; and causing the predicted queries to be displayed, to the user, in an autocomplete user interface element of the search field.

20. The storage medium of claim 19, wherein determining the predicted queries comprises:

selecting the predicted queries from the potential predicted queries based on the predicted query values of the potential predicted queries.

* * * * *

UNITED STATES PATENT AND TRADEMARK OFFICE
CERTIFICATE OF CORRECTION

PATENT NO. : 9,852,233 B2
APPLICATION NO. : 14/137348
DATED : December 26, 2017
INVENTOR(S) : Venkateswaran Subramanian Karthik Page 1 of 1

It is certified that error appears in the above-identified patent and that said Letters Patent is hereby corrected as shown below:

In the Specification

In Column 1, Line 11, after "herein" insert -- . --.

In the Claims

In Column 20, Line 46, in Claim 19, delete "text the" and insert -- text, the --, therefor.

Signed and Sealed this
Thirtieth Day of October, 2018

Andrei Iancu
*Director of the United States Patent and Trademark Office*